INVENTORS.
RICHARD L. BENNETT
FRANCIS O. UNDERWOOD

ATTORNEY

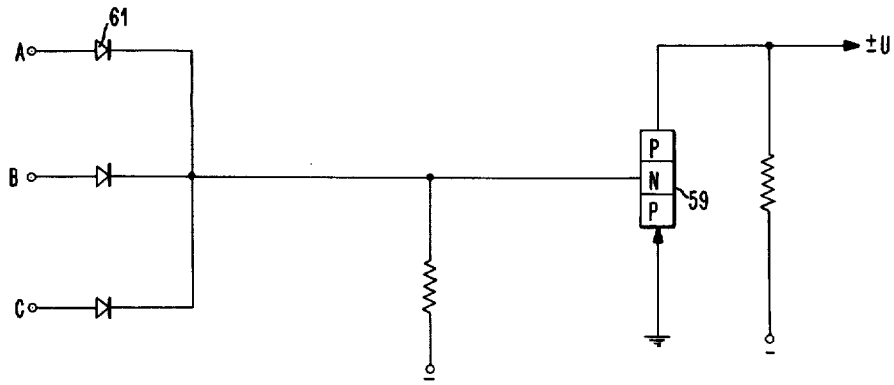
FIG. 3a
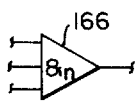
FIG. 3b
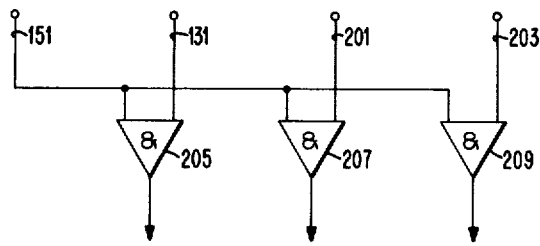
FIG. 8
| FIG. 2a | FIG. 2b | FIG. 2c | FIG. 2d | FIG. 2e |
FIG. 9

May 25, 1965    R. L. BENNETT ETAL    3,185,966
DATA EDITING SYSTEM
Original Filed Sept. 8, 1959    8 Sheets—Sheet 8
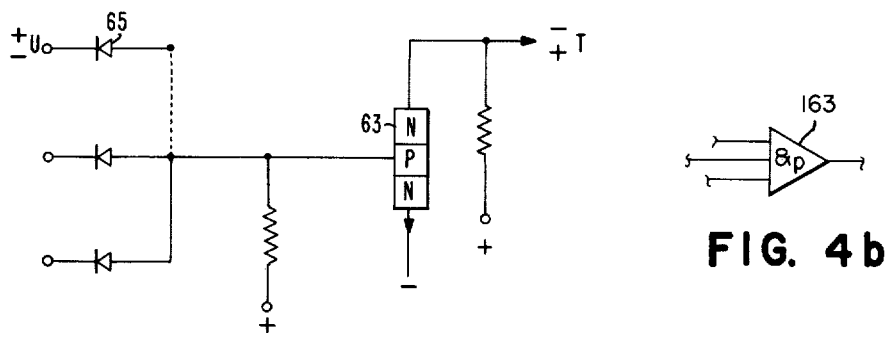
FIG. 4a
FIG. 4b
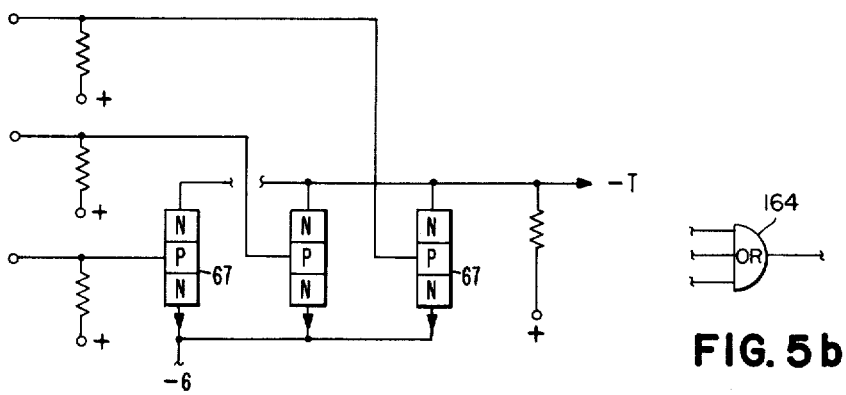
FIG. 5a
FIG. 5b
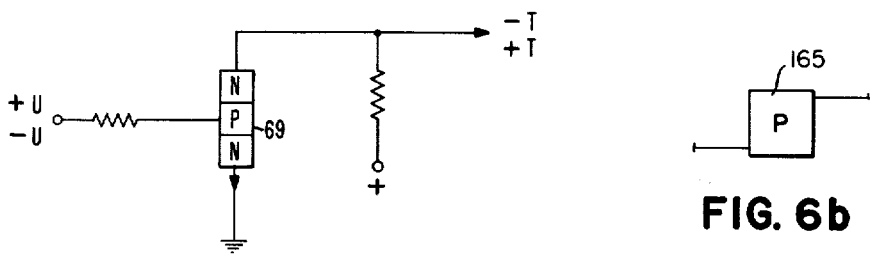
FIG. 6a
FIG. 6b

United States Patent Office 3,185,966
Patented May 25, 1965

---

3,185,966
DATA EDITING SYSTEM
Richard L. Bennett, Vestal, and Francis O. Underwood, Endwell, N.Y., assignors to International Business Machines Corporation, New York, N.Y., a corporation of New York
Continuation of application Ser. No. 838,456, Sept. 8, 1959. This application May 4, 1962, Ser. No. 193,898
14 Claims. (Cl. 340—172.5)

This application is a continuation of our application Serial No. 838,456, filed September 8, 1959, now abandoned. The present invention relates to an editing apparatus and in particular to an editing apparatus in which it is completely controlled by data contained within a data processing machine.

Editing apparatus as presently defined in the data processing field is an apparatus which takes raw data from a machine and converts it to an intelligible form which would contain spaces, punctuation, etc. The usual form which the editing takes is to suppress nonsignificant zeros which occur in the output data from a machine, insert decimal points at the proper locations of an output word, put in commas for signifying various demarcations, utilizing asterisks to indicate various classes of total, put in asterisks to fill up the word to a dollar amount, float the dollar sign to a position adjacent the highest significant digit, tabulate to various positions, indicate whether the amount is plus or minus, etc.

In previously known machines, editing has been accomplished primarily through a plugging arrangement by which the data from predetermined output lines are connected to particular printing mechanisms located in a line so that data can be rearranged and special symbols inserted. This is the type of plugging utilized in electromechanical machines of the early type.

Further advances in editing were accomplished by transferring data between storage locations. By properly plugging address counters the raw data may be formed into a particular format and interconnecting various editing instructions which take precedence over the raw data filled in.

Further refinements have utilized in a computer proper a control word containing the various symbols which are to be located adjacent to various data positions. By processing a data word with this control word through continuously recirculating registers and taking the control word digits first, the control digits are properly interspersed with the data words as the output is removed character by character from the recirculating register. While this type of apparatus is a step forward in the art, it is limited by the number of operations which it can perform. By matching the control data to a particular data word, it can be readily seen that only a limited amount of control can be exercised since the choice is essentially utilizing either the edit symbol or the data digit.

The present invention accomplishes a complete editing routine on selected data by utilization of a control word which contains the format of the edited data by including editing symbols (,), (.), ($), (*), spaces, etc., and digit locations where the raw data is to be placed. This allows for a graphic illustration of the final format during setting up of this control word which is an aid to the programmer as well as providing for a simple operation of the machine in which data may be inserted at each location in which there is no editing symbol to be placed therein.

After the control word and data word are merged and all data characters inserted at the proper locations, this combined word containing data characters and edit characters is again passed through the editing apparatus to remove nonsignificant zeros according to a control mark which was inserted when the data characters and edit symbols were combined. Other operations such as inserting asterisks or utilizing a floating dollar sign adjacent to the most significant digit are also performed in accordance with control marks placed in the combined control word.

It is therefore an object of this invention to provide an improved editing apparatus.

It is a further object of this invention to provide an editing apparatus utilizing a control word containing all editing symbols and data locations for unedited data determining the format of the edited word.

It is another object of this invention to provide an editing apparatus utilizing a control word which may contain special characters indicative of the fact that predetermined characters are to be inserted in place of control or data characters in predetermined locations.

Another object of this invention is to provide an editing apparatus utilizing a control word which may contain special character marks indicative of the fact that predetermined data or control characters are to be replaced by blanks.

The foregoing and other objects, features and advantages of the invention will be apparent from the following more particular description of a preferred embodiment of the invention, as illustrated in the accompanying drawings.

FIGS. 3a, 4a, 5a, and 6a are the circuits contained in the logic blocks used in FIGS. 2a–2e.

FIGS. 3b, 4b, 5b, and 6b are the logic representations for the circuits shown in FIGS. 3a, 4a, 5a, and 6a.

FIGS. 7a–7e are a series of AND circuits.

FIG. 8 is the character generator circuit for editing, and

FIG. 9 shows the manner in which FIGS. 2a–2e are to be arranged.

Figure 1:
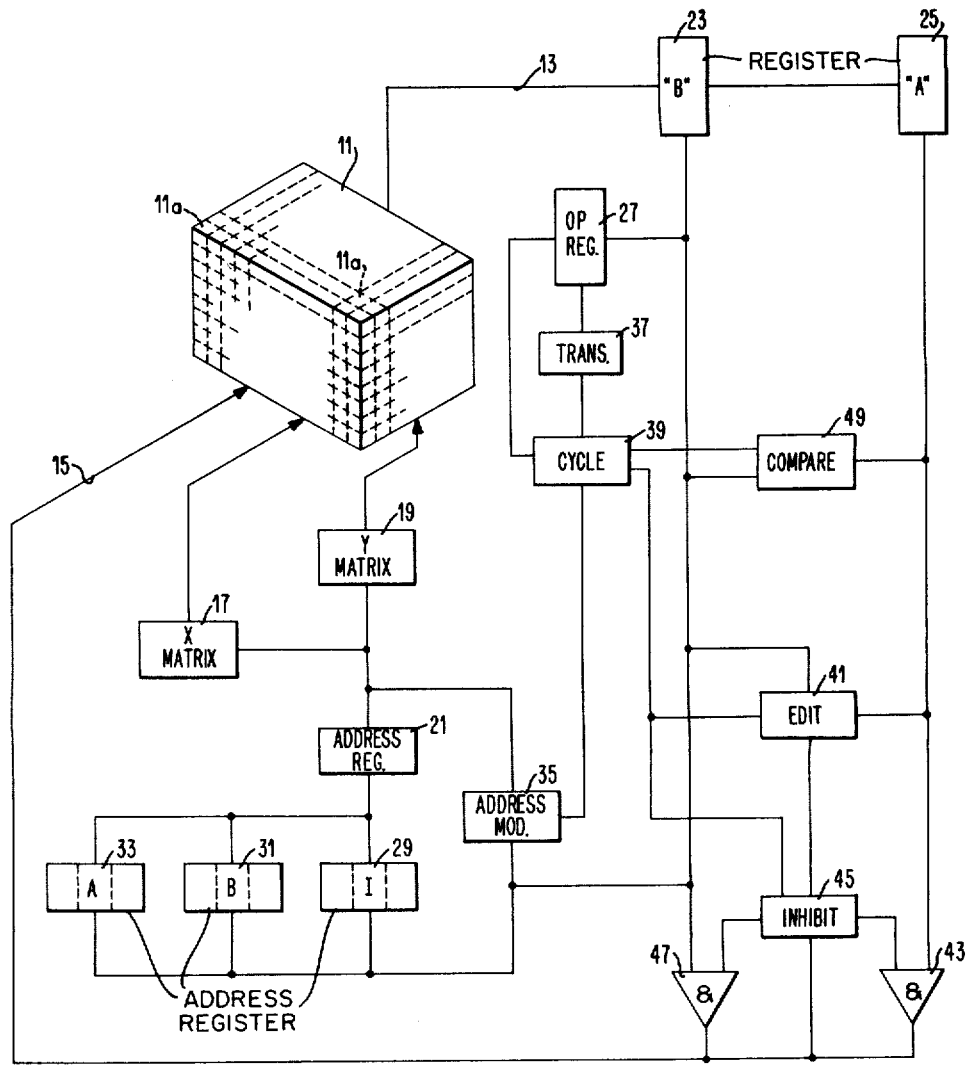
FIG. 1 is a schematic illustration of a data processing machine of which the present invention is a part.
Figure 7A:
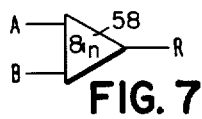
Figure 7B:
Figure 7C:
Figure 7D:
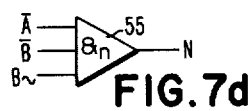
Figure 7E:

The present invention forms part of a data processing system as described in U.S. Patent No. 3,077,580. A schematic illustration of this system is shown in FIG. 1 and will be described generally since the present invention utilizes controls contained therein to obtain the desired sequence of data flow. For a detailed description of this apparatus, reference must be made to the above application.

The data processing machine shown in FIG. 1 utilizes a serial by digit, parallel by bit character flow. A magnetic core storage 11 contains all characters which are to be utilized in the internal operation of the machine. Each character loaction will contain a permutation of eight bits (1 or 0) to signify the particular significance of the character. The character comprises four numeric bits (1, 2, 4, 8), two alphabetic bits (A and B), a parity bit (C) and a demarcation bit called "Word Mark" or "Character Mark." In the particular illustration used in FIG. 1, there would be one character contained in each vertical section 11a which contains eight planes of magnetic core.

With each vertical section of cores set to indicate a particular character, the character may be read out on line 13 or read into on line 15 by selecting a desired coordinate position. This coordinate position is selected in accordance with an X-matrix and Y-matrix which decode an indicated number standing in an address register 21 to obtain the desired coordinates for obtaining the character in storage indicated by this number.

When the character selection is made by the X-matrix and Y-matrix, the magnetic cores containing the individual bits of a character are reset to 0. When reset to 0 any character standing therein prior to this selection will be transferred to a buffer recirculation register 23 as the combination of bits previously contained in said column of cores.

The character then standing in the buffer recirculation register 23 is transferred to a storage recirculation register 25 and also returned to the same position in storage 11 by line 15 at the location from which it originated or utilized in a logic operation and the results stored in the location from which it originated. Operation characters are stored in an operation register 27 in contradistinction to the above. However this portion of the apparatus will be explained hereinafter.

In the operation of the present machine, the address of the next instruction is contained in an instruction register 29. The address, which is a number, specifies the first digit of an instruction word contained in storage 11, in a group of locations designated generally as instruction word locations. The instruction word assumes the following format:

The Op code which determines the operation of the machine is a one character designation such as E (for edit), A (for add), etc. The A address and the B address may contain up to three digits each and specify respectively the initial digit of two operands which are to be used in the process designated by the operation code. Other operation codes may be used in seriation following the A and B address if the operations designated thereby are to be performed on groups of characters which follow the first groups of characters designated by the initial address of A and B.

As evidenced by the above format of the instruction word, the instructions may be of any length or as short as desired. In a similar manner the operands, or data on which an operation is to be performed, are of no fixed length. To designate the beginning of an instruction or the end of an operand, a character mark is utilized with the particular digit concerned to indicate the fact. This character or word mark is carried in an additional core plane (#8).

In operation, the instruction word is read from storage 11, character by character to the buffer recirculation register 23. The first character, which is the operation code, is stored in the operation register 27. The succeeding characters are the addresses to be employed by the A and B memory address registers 33 and 31. The instruction register 29 is advanced to the next address by an address modifier 35, which adds one or some other digit to the number stored in the address register which is recirculated to the instruction register as the address for the next instruction digit.

After the complete operands' addresses have been read into the A and B memory address registers, abbreviated hereinafter as A MAR and B MAR, the operation will proceed in accordance with the operation character stored in operation register 27. The operation register 27 is connected to a translator 37 which translates a particular operation character to a form recognizable by a cycle control 39.

The cycle control 39 is the controller for the machine and transmits all the necessary signals to all parts of the apparatus to provide an appropriate operation for the operation code then stored in the operation register 27.

In the cycle control 39, A and B cycles originate to read data from storage 11 to the registers 23 and 25. In an A cycle a character is read from storage 11 at the location specified by the A MAR 33 into the B register 23 on the read portion of the cycle and back into the same digit position in storage 11 on the write portion of the A cycle at the same time that it is stored in the register 25.

In general, there are two operation cycles, A and B, with two registers A and B, 25 and 23, to accept characters designated by the A and B MARS 33 and 31. Each time an A or B cycle is used, the address standing in the A MAR or B MAR register is modified, by one, to designate the next successive digit location in storage 11 which will be read on the next related cycle. In an ordinary case the results of an operation on operands stored at an A and a B location will be found at the B location.

In editing, the format control word is stored at the sequential locations denoted by the first digit address stored in the B MAR. The data which is to be edited is similarly stored in a location denoted by the address of the first digit stored in the A MAR. When an edit operation code is used, the digits are read out from each location to the A register 25 and B register 23 as set forth below.

On a B cycle the number stored at address 300 will be brought to the B register and by virtue of the logic control of the edit circuit 41 (which samples both the A register character and the B register character) either returns the B character to its location in memory, returns the A character to the B location in memory, or inserts an entirely different character through the inhibit gate control. In any event, the results of a logic operation will be to place the resulting digit in the location specified by the B MAR from which the information was read on the B cycle.

Since the character stored in the A register must of necessity pass through the B register, it is believed evident that an A cycle will be taken only when the A digit is removed from the A register and a B cycle is taken when the A digit is taken from the B register.

With a control word at the B addresses denoted by the B MAR 31, it will be seen from the detailed description below that each control word digit controls the digit read in on the B cycle and the resultant word, stored at the addresses specified by the B MAR 31, will be composed of characters from the A location interspersed with the control word characters and any special characters.

When a complete merging operation has occurred, the editing apparatus 41 determines whether another instruction cycle will occur or whether the information merged data now stored at the former control word locations will be reread through the B register 23 with a further editing process by edit apparatus 41.

Before proceeding with a detailed description of the editing apparatus and the logic circuitry used, reference will be made to FIGS. 3–7 of a detailed description of the logic blocks.

FIG. 3 illustrates an AND circuit using a PNP transistor 59. A series of diodes 61 couple the inputs to the base of the transistor. When all diodes are biased by a −T voltage, the PNP transistor provides a +U voltage. If any diode 61 is biased by a +T voltage, the output drops to −U. FIG. 3b shows the schematic representation of the circuit.

In FIG. 4a, an AND circuit utilizing an NPN transistor is shown in which all diodes must be biased to a +U voltage to provide a −T voltage output. Any −U voltage on any diode 65 will provide a +T output. FIG. 4b illustrates the schematic representation of the circuit.

In FIG. 5a, an OR circuit using NPN transistors provides a −T output voltage for any +U input voltage. FIG. 5b illustrates the schematic representation of the circuit.

FIG. 6a is a circuit for a P block which converts a +U voltage to a −T output voltage and a −U input voltage to a +T output voltage. An N block converts a +T to a −U and a −T to a +U. FIG. 6b is the schematic representation of the circuit.

The coding of the data and also the instruction words are shown for selected series of characters:

| Character | Machine Code | | | | | | |
|---|---|---|---|---|---|---|---|
| | C | B | A | 8 | 4 | 2 | 1 |
| Blank | X | | | | | | |
| , | | X | X | X | | X | X |
| & | | X | X | X | | | |
| $ | | X | X | | X | X | X |
| * | | X | X | | X | | |
| - | | X | | | | | |
| . | X | | X | X | | X | X |
| A | | | X | X | | | X |
| B | | | X | X | | X | |
| C | | | X | X | | X | X |
| K | | X | X | | | X | |
| L | | X | X | | | X | X |
| S | X | | X | | | X | |
| T | | | | X | | X | X |
| 0 | X | | | X | | X | |
| 1 | | | | | | | X |
| 2 | | | | | | X | |
| 3 | X | | | | | X | X |
| 4 | | | | | X | | |
| 5 | | X | | | X | | X |
| 6 | X | | | | X | X | |
| 7 | | | | | X | X | X |
| 8 | | | | X | | | |
| 9 | X | | | X | | | X |

No attempt has been made to present all the characters which are used in the machine. The ones here selected appear to be advantageous in that they will later be used in describing examples in this machine. The letter designations have been shown for three portions of the alphabet and indicate generally that the letter coding is changed for each group, while the numeric coding is the same for each group.

For a particular editing operation, assume that the instruction for this particular operation is as follows:

| | E | 7 | 8 | 9 | 3 | 0 | 0 |
|---|---|---|---|---|---|---|---|
| Memory Address | 001 | 002 | 003 | 004 | 005 | 006 | 007 |

E is the operation code denoting an editing operation while the digits 789 denote the address of the first digit of data word to be operated on, while 300 denotes the address of the first digit of the format control word to be used in conjunction with the present editing operation. These digits were read into the A MAR and B MAR, respectively, by a series of instruction cycles.

The data word standing at address 789 and succeeding locations is as follows:

| Data Word | 0 | 0 | 2 | 5 | 7 | 4 | 2 | 6 |
|---|---|---|---|---|---|---|---|---|
| Memory Address | 782 | 783 | 784 | 785 | 786 | 787 | 788 | 789 |

The control word standing at address 300 and lower is as follows:

Control Word

| | | At Memory Address |
|---|---|---|
| $ | 284 | b ... 293 |
| b | 285 | b ... 294 |
| b | 286 | & ... 295 |
| b | 287 | C ... 296 |
| , | 288 | R ... 297 |
| b | 289 | & ... 298 |
| b | 290 | * ... 299 |
| 0 | 291 | * ... 300 |
| . | 292 | |

As pointed out in detail by a set of rules, set forth below, the control performed by the various characters of the control word is in accordance with these prescribed rules and the circuits for carrying out these prescribed rules are illustrated in FIGS. 2a through 2e, the operation of these circuits being set forth in detail below.

With the operation code standing in the register 27 and the addresses of the data word and control word standing respectively in the A and B MAR registers, the machine is ready to execute an edit operation. As it will be remembered, an A cycle is one in which the digit stored at the location indicated in the A MAR 33 is taken from memory, passed through the B register, restored to its original position in storage 11 and moved to the A register. A B cycle is one in which the digit stored at the location indicated by the B MAR 31 is taken from storage 11 and put into the B register. The B register will contain a control word character which may be returned to memory at the B address or cause the A character to be placed at that address instead of the control character being discarded or cause a new character (not in the A register) to be placed at that address.

The chart below illustrates all the operations which are performed on the data word set forth above in conjunction with the control word also set forth above.

| Step | Type of Cycle | Memory Address Registers | | | Reg. | | Put Back Into Memory | "B" field at End of Cycle |
|---|---|---|---|---|---|---|---|---|
| | | I | A | B | B | A | | |
| 1 | A | 008 | 0788 | 0300 | 6 | 6 | 6 | $bbb,bb0.bb&CR** |
| 2 | B | 008 | 0788 | 0299 | * | 6 | * | $bbb,bb0.bb&CR** |
| 3 | B | 008 | 0788 | 0298 | 6 | 6 | * | $bbb,bb0.bb&CR** |
| 4 | B | 008 | 0788 | 0297 | & | 6 | Blank | $bbb,bb0.bb&CRb** |
| 5 | A | 008 | 0788 | 0296 | R | 6 | Blank | $bbb,bb0.bb&Cbb** |
| 6 | B | 008 | 0788 | 0295 | C | 6 | Blank | $bbb,bb0.bb&bbb** |
| 7 | B | 008 | 0788 | 0294 | & | 6 | Blank | $bbb,bb0.bbbbbb** |
| 8 | B | 008 | 0788 | 0293 | b | 6 | 6 | $bbb,vb0.b6bbbb** |
| 9 | A | 008 | 0787 | 0293 | 2 | 2 | 2 | $bbb,bb0.b6bbbb** |
| 10 | B | 008 | 0787 | 0292 | b | 2 | 2 | $bbb,bb0.26bbbb** |
| 11 | A | 008 | 0786 | 0292 | 4 | 4 | 4 | $bbb,bb0.26bbbb** |
| 12 | B | 008 | 0786 | 0291 | . | 4 | | $bbb,bb0.26bbbb** |
| 13 | B | 008 | 0786 | 0290 | 0 | 4 | 4 | $bbb,bb4.26bbbb** |
| 14 | A | 008 | 0785 | 0290 | 7 | 7 | 7 | $bbb,bb4.26bbbb** |
| 15 | B | 008 | 0785 | 0289 | b | 7 | 7 | $bbb,b74.26bbbb** |
| 16 | A | 008 | 0784 | 0289 | 5 | 5 | 5 | $bbb,b74.26bbbb** |

TABLE—Continued

| Step | Type of Cycle | Memory Address Registers | | | Reg. | | Put Back Into Memory | "B" field at End of Cycle |
|---|---|---|---|---|---|---|---|---|
| | | I | A | B | B | A | | |
| 17 | B | 008 | 0784 | 0288 | b | 5 | 5 | $bbb,574.2bbbb** |
| 18 | A | 008 | 0783 | 0288 | 2 | 2 | 2 | $bbb,574.2bbbb** |
| 19 | B | 008 | 0783 | 0287 | , | 2 | , | $bbb,574.2bbbb** |
| 20 | B | 008 | 0783 | 0286 | b | 2 | 2 | $bb2,574.26bbbb** |
| 21 | A | 008 | 0782 | 0286 | 0 | 0 | 0 | $bb2,574.26bbbb** |
| 22 | B | 008 | 0782 | 0285 | b | 0 | 0 | $b02,574.26bbbb** |
| 23 | A | 008 | 0781 | 0285 | 0 | 0 | 0 | $b02,574.26bbbb** |
| 24 | B | 008 | 0781 | 0284 | b | 0 | 0 | $002,574.26bbbb** |
| 25 | B | 008 | 0781 | 0284 | $ | 0 | $ | $002,574.26bbbb** |
| 26 | B | 008 | 0781 | 0285 | $ | 0 | $ | $002,574.26bbbb** |
| 27 | B | 008 | 0781 | 0286 | 0 | 0 | Blank | $b02,574.26bbbb** |
| 28 | B | 008 | 0781 | 0287 | 0 | 0 | Blank | $bb2,574.26bbbb** |
| 29 | B | 008 | 0781 | 0288 | 2 | 0 | 2 | $bb2,574.26bbbb** |
| 30 | B | 008 | 0781 | 0289 | , | 0 | , | $bb2,574.26bbbb** |
| 31 | B | 008 | 0781 | 0290 | 5 | 0 | 5 | |
| 32 | B | 008 | 0781 | 0291 | 7 | 0 | 7 | |
| 33 | B | 008 | 0781 | 0291 | 4 | 0 | 4 | $bb2,574.26bbbb** |

The different columns are indicated as follows:
(1) Step which indicates the number of the step which has ensued since the beginning of the initial instruction cycle
(2) Type of Cycle which tells whether it is A or B
(3) Memory Address Registers and Reg.
 (a) I register which indicates the address of the instruction which is to be next performed after the edit operation has been completed
 (b) The A register which contains the address of the next digit to be taken from the storage which digit is a data word character in this case
 (c) The B register which contains the address of the next digit of the control word to be taken from storage
 (d) Column labeled "REG" indicates the contents of the respective A and B registers
(4) Put Back Into Memory indicates which character is put back in storage from the A or the B register or indicates the character "created" under control of the edit characters
(5) B Field at the End of the Cycle indicates the contents of the control word when the operation is started and the progressive changes in the contents thereof.

The number of asterisks at the right-hand side of the control word as shown in the chart indicates the type of total in accounting procedure. This is a conventional description in which one asterisk would indicate a minor total, two asterisks would indicate an intermediate total, and three asterisks would indicate a major total. These are chosen by the programmer in selecting the control word and he may in a given case pick a control word from its location in the memory by using the address of the first, second, or third asterisk depending on which class of total he is presently concerned. In this particular case the first address in the instruction is that of the second asterisk to indicate an intermediate total. It is of course possible in a given situation that no asterisk at all will be required, in which case the address of the credit symbol R would be used.

A detailed description of the respective steps illustrated in the above chart will now be given:

In Step No. 1, an A cycle operates to take the digit stored in location 789 "in the A memory address register," which is a 6 (as illustrated above) and which 6 is placed in the B register and moved to the A register and at the same time transferred back to memory at the same location 789. On step 2, which is a B cycle, the digit located at 300 (signified by the B MAR) which is an asterisk (as illustrated above) is transferred to the B register and since this is a punctuation mark for utilization in the word, it is transferred back to its location at this B address 300 and a further B cycle is taken (step 3) to obtain the next control character at B MAR address 0299. The 6 which was included in the A regsiter remains as is (as indicated in column REG, under A, for step 3). On this next cycle (step 3), which is a B cycle, the character (namely an asterisk) at B MAR indication 299 is taken out. Since this is also an asterisk, it is put back at address 299 of the B field (like the first asterisk was put back at address 300 of the B field) so that the two asterisks are now in the edited word as indicated. On Step No. 4, the digit at the address 298 (contained in B MAR) is an ampersand which is placed in the B register. The ampersand is not returned to memory as were the asterisks (see Rule 1. g below), but its position in memory is replaced by a space symbol in the "edited" word between the * and the next scanned character, namely R.

The CR (credit symbol) contained in the control word (stored in the B field as RC, reading from right to left) acts as a sign indication. The sign of the data word in the problem being discussed is plus (as indicated by the lack of a B bit over the units digit). Thus the CR symbol is not required and will be replaced by blanks (see c below). If, however, the sign of the units digit (stored at 789 in the A field of memory) carried a minus symbol (a B bit over the units digit), then the CR symbol would be reproduced.

In this case, in Step Nos. 5 and 6, it can be seen that successive B cycles are taken and the letters R and C are respectively brought out from B field digit positions 297 and 296 and are replaced by blanks put back into memory in the B field so that the partially edited control word at Step No. 6 (see chart above) includes three blanks and two asterisks to the right of the ampersand. In Step No. 7 the digit at 295 of the B field which is another ampersand is replaced by a blank (see Rule 1. g below) in the edited word. In Step No. 8 the next B character is brought out (see Rule 1. a below) which is a blank, which will cause the character 6, remaining in the A register, to be transferred to memory, in the B field, so that a 6 replaces the blank at location 294 (see B field at end of cycle for Step No. 8 in the chart above). On Step No. 9 an A cycle is taken, and a digit in location 788 (as indicated in the A MAR), which is a 2, is advanced into the A register and also returned to the same A field location in the data word. At step 10, a B cycle is taken, and the character (a blank) stored at location 293 of the B field is brought out. This (see Rule 1. a below) causes the number 2 in the A register to be transferred to location 293 of the B field. In the next two respective A and B cycles (steps 11 and 12), the digit 4 from the A field data word is brought out to the A register and the decimal point is brought out from the B field and placed in the B register. In this case, however (see Rule 1. c below) the decimal point takes precedence over the digit from the data field and is returned to the same location in memory (see step 12, column "PUT BACK INTO MEMORY" in the chart above).

In Step No. 13, zero is read out of the B field and under its control the data character 4, remaining in the A register, replaces zero (see Rule 1. b below) in the control word. This zero was originally included in the B field control word to indicate that a zero suppression operation is desired. When this particular zero is sensed, it sets up a latch (as described below in the recapitulation of step 13) which will cause zeros to be suppressed during the reverse scan operation to be described presently. The limit of this reverse scan operation is indicated by the word mark which is automatically added to the character 4 in this position (see also recapitulation of step 13 below). This word mark is simply an additional bit placed in the character.

The forward scan process continues as indicated in the chart above, the data word characters being inserted in place of the blanks in the control word until at step 19 the comma at location 288 of the B field is reached in the control word, and this comma is reinserted in the B field (see Rule 1. d below). In Step No. 20 the digit 2, remaining in the A register, is inserted in place of the blank at address 287 of the control word. In step 21, zero is read from the A field and placed in the A and B registers and also back into Memory in the A field. In step 22 this zero replaces the blank in the B field at address 286 thereof.

At step 23, the zero of the data word, containing a word mark, is sensed in the A field and enters the A and B registers and is replaced in the A and B fields, without the word mark, as described below in the recapitulation of step 23. The operation at step 24 is described in detail below but briefly this zero, without the word mark, replaces the blank at address 285 of the B field. At step 25 the dollar sign, containing a word mark, is sensed. The word mark in the dollar sign signifies the end of the control word and is removed from the dollar sign as described below in the recapitulation of step 25, and the dollar sign without the word mark is inserted at address 284 of the B field as shown in the edited word to the left of the last zero. The scanning of this B field word mark stops the forward scan (see Rule 2 below) whereby the dollar sign is returned. On steps 27 and 28 (on the reverse scan), each zero which is detected is replaced with a blank (see Rule 6 below). At step 29 we reach the first significant digit at which time this digit is replaced by itself (see Rule 6 below) and any additional zeros are not blanked. This process continues until the 4 digit containing the automatically inserted word mark (see step 33) is reached at which point the operation is properly terminated (see Rule 6 below).

The operations just described comprise the standard editing feature of this machine, without certain extra features which may be included as optional editing features. These features, which will be described presently, are asterisk fill, floating dollar, sign control left, and decimal elimination. The first two options are controlled by the real characters "*" and "$" which, when written, function to set word marks and transfer from the A register in the same manner as with zero suppress, as described in detail below.

The Asterisk Fill option replaces zeros and punctuation, wth asterisks, until a significant digit is sensed. It is, however, necessary that a 0 or blank appear to the right of this "control" asterisk in order to turn on the body latch as described below and give the asterisk character control power. The Floating Dollar option functions as does zero suppression, reverses and scans the edit word until the automatically inserted word mark is sensed (see step 13). At this point a second forward scan is initiated which continues until a blank position is sensed. At this point a "$" symbol is inserted and the Edit operation stops.

Decimal Control functions if a decimal is sensed on the reverse scan. Further suppression of zeros is blocked so that even though the zero suppress latch is still on blanks are not created. If a significant digit is not present in one of the positions to the right of the decimal to reset the zero suppression latch before the end of the cycle in which the automatically inserted word mark is sensed, then a new forward scan is created. During this scan all zeros and the decimal point will be blanked. The Edit operation stops at the decimal column.

For Sign Control Left it is necessary to operate a latch which is set by the B bit in the units position of the A field. CR and — will refer to this latch for regeneration or blanking.

These optional features and the standard editing operation described above can be stated as a number of rules, numbered, as set forth below, which rules when carried out by the circuitry described in detail below provide the editing for any particular data word in accordance with the contents of the edit control word.

| Rule No. | Control Character | Function |
| --- | --- | --- |
| 1. a | Blank (b) | Indicates positions to be occupied by characters of the A field. Calls for a transfer from A register. |
| 1. b | 0 | Same as blank but also marks rightmost limit of zero suppression. Suppression will not take place if this character is omitted from the control word. |
| 1. c | . | Regenerated in position where written; will be removed if total balance is zero and Decimal Control option is installed and control zero appears on the right side of the decimal point. |
| 1. d | , | Regenerated in position where written; will be removed by zero suppress operation. |
| 1. e | CR | Remains in storage if sign of data is negative, blanked out if sign is positive. May be used in body of control word without being subject to sign control. |
| 1. f | — | Same as CR. |
| 1. g | & | Creates a blank space, may be used in multiple. |
| 1. h | * | Regenerated where written; used singly or in multiple to indicate class of total or singly to initiate Asterisk Fill at which time it acts as a 0. |
| 1. i | $ | Regenerated where written; will float if written in body of control word. |

There are other rules that the machine obeys. These are listed briefly as follows:

Rule 2—In edit, the forward scan is stopped by the B word mark only.

Rule 3—After the last A field character is transferred, punctuation, remaining in the control word, is not regenerated, instead blank positions are created.

Rule 4—Any character not listed under Rule 1 may be written in the control word and will be inserted unconditionally.

Rule 5—CR and — symbols are blanked if the A field is positive. If CR and — are required regardless of the sign, then a sign should be forced in the units position of the A field.

Rule 6—If a zero has been written in the control word, a word mark is automatically inserted when this position is first scanned. After detection of the B field word mark, the character which contained the word mark is inserted in the edited control word, without the word mark contained therein, the scan is reversed, with zeros and punctuation being changed to blanks. When a significant digit is sensed, zero and punctuation suppression ceases and unaltered regeneration begins. Any nonpunctuation character will restore zero suppression until the next significant digit is sensed. This action may be repeated but will end when the automatically inserted work mark is sensed.

Rule 7—"A" field data, not transferred, before the B word mark is sensed, will not appear in the edited data. The A field may contain fewer, but should not contain more, positions than the sum of the blanks and zeros in the control word.

In the asterisk fill option, which will be described presently on the reverse scan, after the dollar sign has been replaced in the control word, the zeros, which have been inserted on the forward scan, will be replaced with asterisks so that the dollar sign will first appear, then the asterisks and finally the amount. This, therefore, is similar to zero suppress except that asterisk fill is utilized. The floating dollar sign is not used with the asterisk fill, since it is necessary to move the dollar sign next to the most significant digit, which does not require an asterisk fill.

The apparatus of the present invention controls the data processing unit, shown generally in FIG. 1, by providing for an elimination of A cycles except when a signal is transmitted to specifically take an A cycle. A further control is provided to permit the data in the A register to be transmitted through the AND circuits 43 and 47 (FIG. 1) by control of the inhibit gates.

With the editing circuits as illustrated in FIGS. 2a to 2e, inclusive, controlling the machine in accordance with the rules set forth above, all decisions as to placing or not placing the information in the edited portion of the control word will originate on the B cycle. At this time the control word data will be transferred back into the edited portion of the control word from which it was taken or a different character, determined by the edit control circuits, will be inserted at this address.

Some of the controls, referred to in the present application, are shown in detail in U.S. Patent No. 3,077,580. Legends have been utilized in instant application to show the indicated values on the various lines.

In FIGS. 7a–7e a series of AND circuits 58, 51, 53, 55, and 57 are illustrated for some of the common input combinations and provide the special characters as shown which are also shown (FIG. 2a) as conditioning AND circuits 42, 74, 76, 63, 78, 79, 80, 71, and 12. The AND circuits 42, 74, 76, 63, 78, 79, 80, and 71 are used for the required sensing.

Figure 2A:
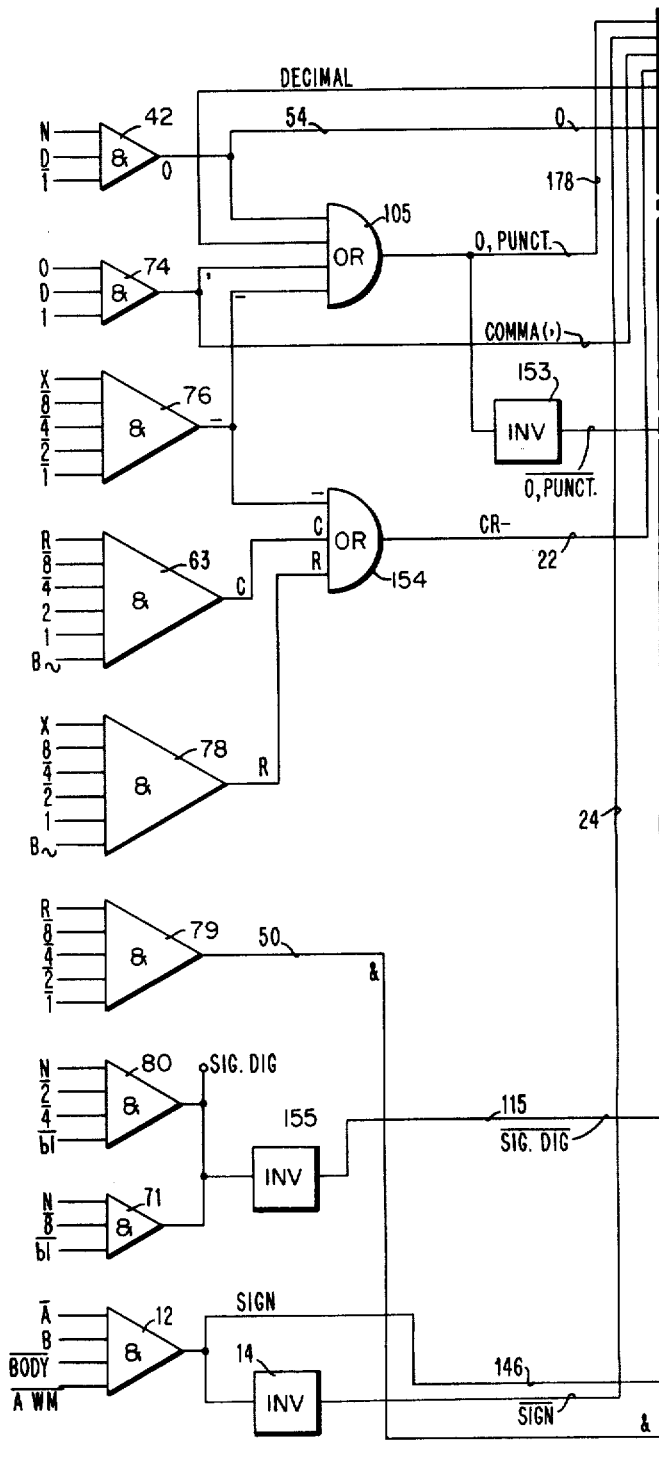
FIGS. 2a–2e are a detailed circuit of the editing apparatus.
Figure 2B:
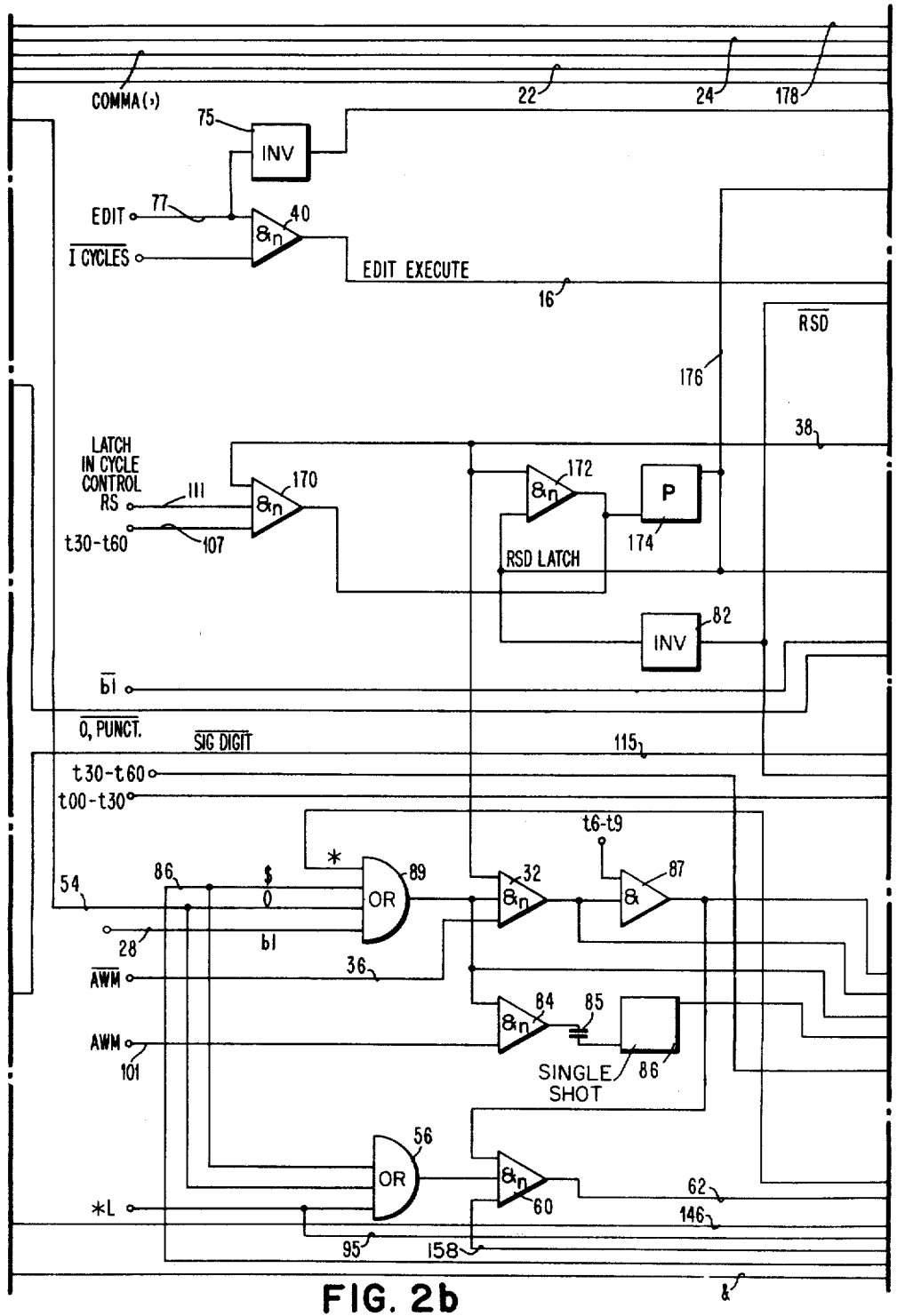
Figure 2C:
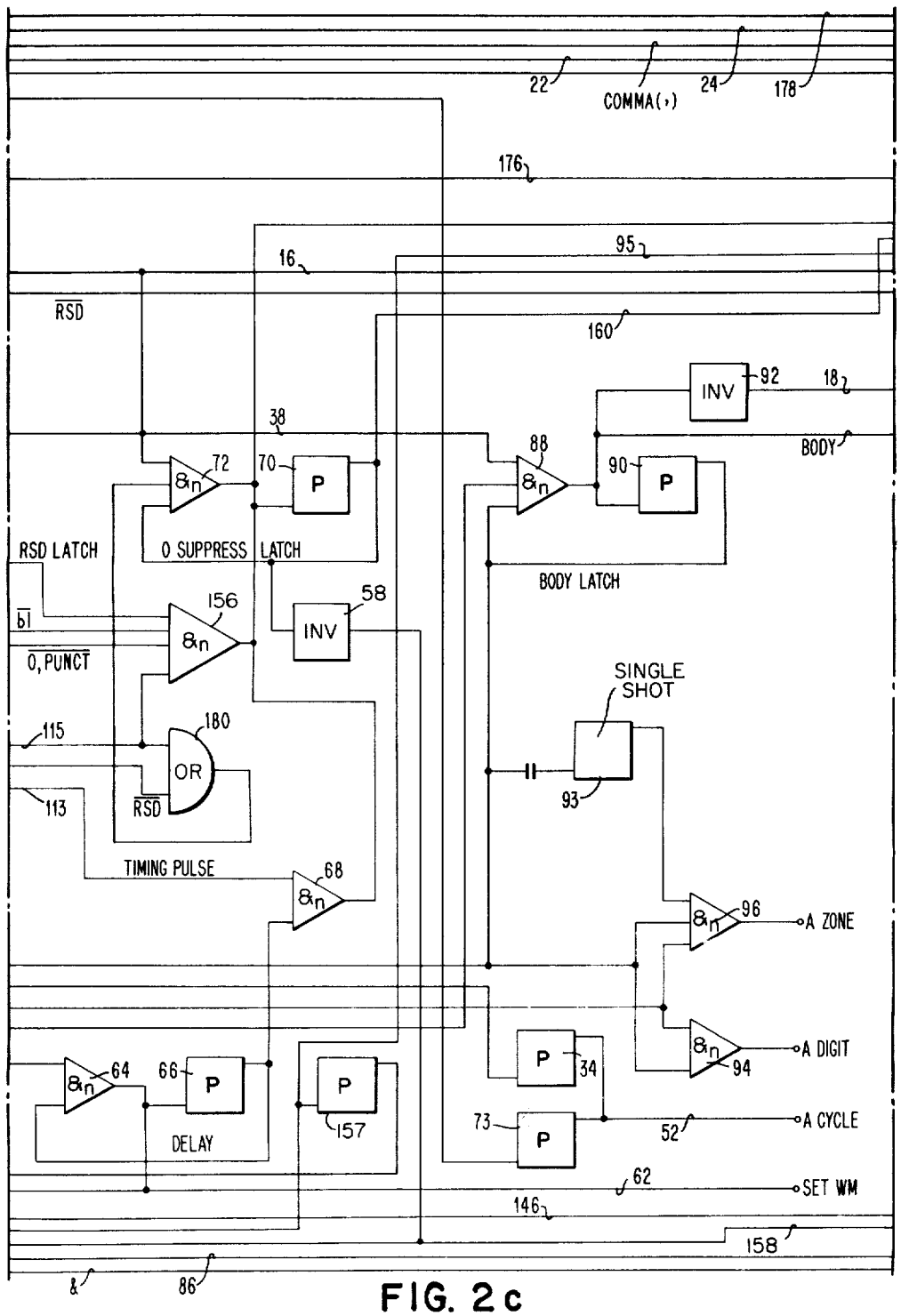

Referring to FIG. 2c, the controls for requesting an A cycle are indicated by line 52 which is fed by a P type inverter 73 in turn controlled by an inverter 75, FIG. 2b, connected to the Edit line 77 from the operation decode register. This insures that during an edit operation the A cycle line, which would normally be connected to the cycle control to produce A cycles alternatively with B cycles, is disabled, and the machine will take successive B cycles until the P inverter circuit 34, FIG. 2c, is operated, which is connected to the AND circuit 32, FIG. 2b, controlled by the OR circuit 89 fed by dollar signs, zeros, or blank indications on lines 86, 54, or 28.

AND circuits 94 and 96 (FIG. 2c) are controlled by means subsequently to be described to allow the data stored in the A register 25 to be selectively transferred through the AND circuits controlled by the inhibit circut 45 (FIG. 1) back into the B address location.

Figure 2D:
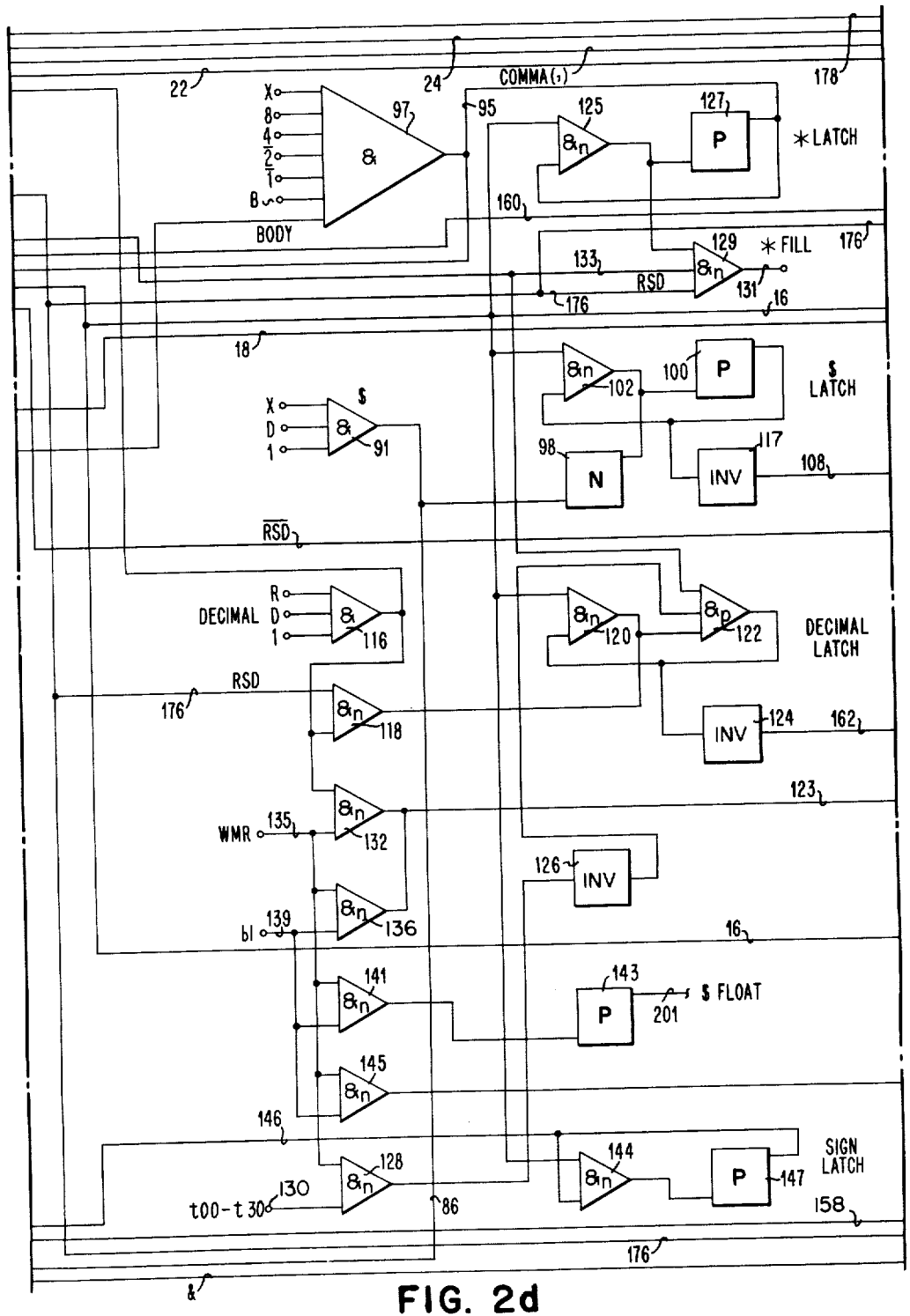
Figure 2E:
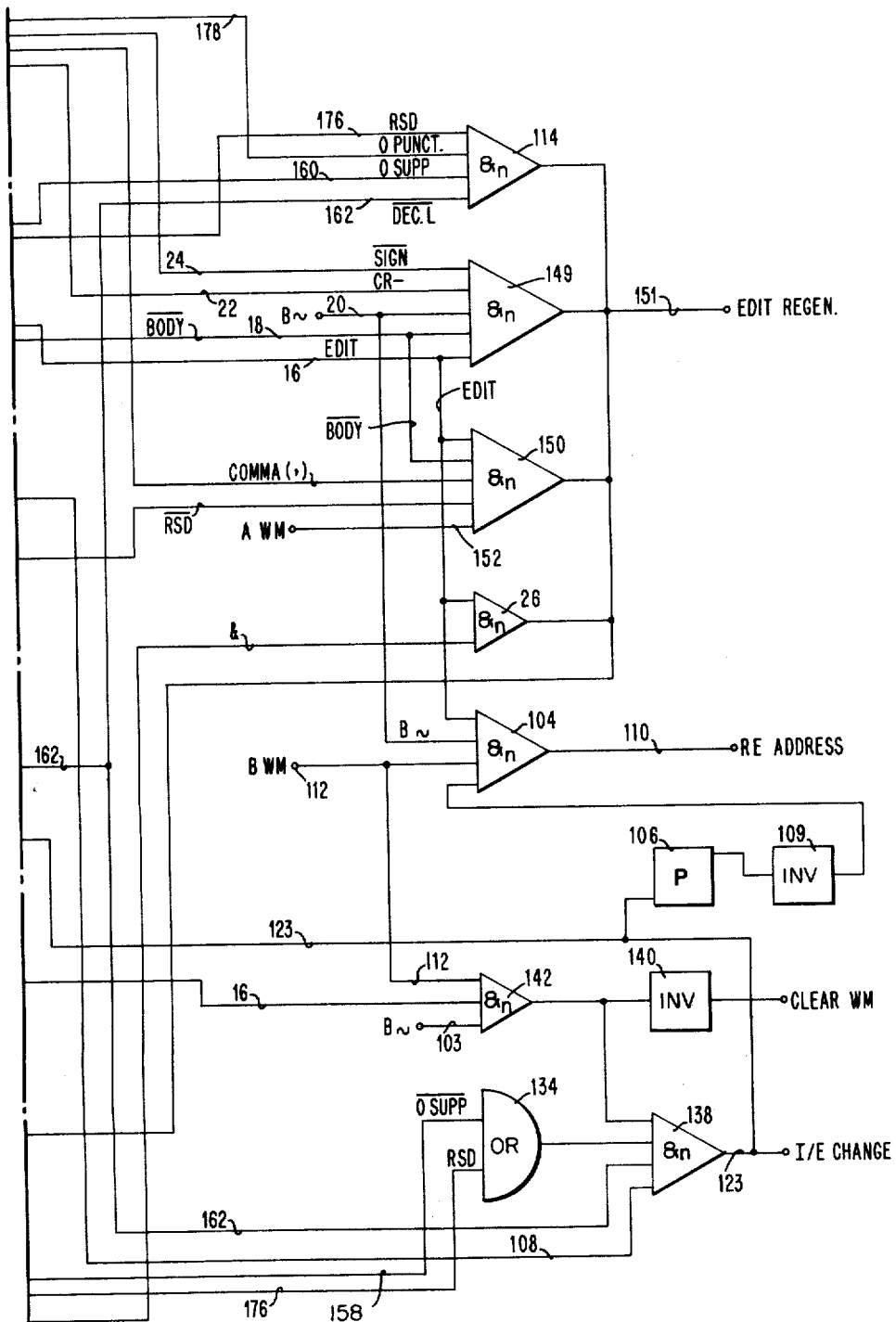

In FIG. 2e, the line 151 EDIT REGEN is connected to a circuit to be described subsequently, whereby a signal on this line will indicate that the machine is to generate a redundancy check C bit (which is the coded representation for a blank) in the absence of special conditions, such as an asterisk or a dollar sign. In the case of the C and R credit characters if the sign is plus, we normally replace the C and R characters with blanks; if the sign is minus, this condition will override the blank insertion process and print the C and R symbols.

In discussing the example given above, it will be remembered that the first asterisks are to be reinserted into the edited portion of the B control word. The circuits shown in FIGS. 2a–2e have no apparatus for sensing this information which is brought out from the control word during a B cycle so that it is automatically inserted back into the place from which it originated, and another B cycle is taken.

In recapitulation of certain of the 33 steps set forth in the chart above, the first step which is significant is when the blank is sensed (via line 28, FIG. 2b, labeled blank) in the control word on Step No. 8. This signal is transmitted through OR circuit 89, FIG. 2b, to the AND circuits 94 and 96 (FIG. 2c) to condition one leg of each. At the same time this signal is transmitted through AND circuit 87 (FIG. 2b) with a timing pulse as shown to another leg of AND circuits 94 and 96. The output of AND circuits 94 and 96 are used to drive the inhibit gate 45, FIG. 1 and open the AND gate 43 to allow the character, then standing in the A register, which is the numeral 6 shown in Step No. 8, to be placed in the B edited portion of the control word at memory position 294 (see B field at end of cycle in chart above). Furthermore, this signal on line 28 through OR circuit 89 sets the body latch (FIG. 2c) consisting of AND circuit 88 and P circuit 90 to indicate that the apparatus is now scanning the body portion of the control word. When the body latch 88 and 90 goes on, the single shot 93 (FIG. 2c), capacitively coupled to the Body Latch line, will be pulsed to block the AND circuit 96, normally conditioned on, to prevent any sign bit contained with the digit in the A register from being included with the digit 6. The AND circuit 96 controls the zone portion and the AND circuit 94 controls the digit portion. The sign indication as stated above is stored as a zone bit which, together with the digit 6, would thus form an alphabetic character. To prevent this thus formed character from being printed, it is necessary to block the zone transfer. The single shot 93 is only on for the time necessary to block the transfer of the zone bit from the A register and subsequently conditions the AND circuit 96 to allow any alphabetic characters appearing thereafter to be regenerated into memory. The BODY portion, denoted by turning the body latch on, is that portion of the control word which is meant to work with the data word as distinguished from the portion of the control word for determining sign, total symbols, and spaces.

As described above, the data word digit 4 is moved into the A register and on cycle 12, which is a B cycle, and the period (decimal point) is moved into the B register. There is no circuit present in the edit control for recognizing a period at this time so that in accordance with the rules set forth above (see Rule 1, c above) the period is regenerated back into storage at location 292 (see B field at end of cycle in the chart above).

On Step No. 13, as described above, a zero is placed in the B register and is sensed by AND circuit 42, FIG. 2a, and transmitted through line 54 (FIGS. 2a and 2b) to the OR circuit 89 and through AND circuit 32 to the P circuit 34 (FIG. 2c) to initiate an A cycle and on step 13 we bring down the 4 standing in the A register. At the same time through the OR circuit 56 (FIG. 2b), the signal is connected to AND circuit 60 which in turn has one of its legs connected to the output of AND circuit 87 (FIG. 2b) and the other leg connected to the output of inverter 58 (FIG. 2c) indicative of the fact that the zero suppression latch 72 has not been set. The output of AND circuit 60 furnishes, via line 62, a signal to the DELAY latch consisting of AND circuit 64 and circuit 66, which latch (FIG. 2c) furnishes a signal to AND circuit 68 to thus (after a delay) set the 0 SUPPRESS latch 72 and 70 (FIG. 2c) at the beginning of the next cycle. At the same time that the set of the DELAY latch is initiated, the output of AND 60, FIG. 2b, is fed to this line 62 to produce Set Word Mark, which word mark is represented by the presence of an 8th bit provided to a character. This word mark is employed to indicate some particular fact. In this particular case, the word mark is set when the zero is returned to the B field and on reverse scan is indicative of the point at which zero suppression is to be terminated.

It should be noted here that a word mark may be set and the zero suppression latch may be operated by use of an asterisk placed in the body portion of the control word or a dollar sign in the BODY portion in the same manner as that described with regard to a zero. Each one of these indicates a different operation to be performed. The asterisk line from the recognition circuit 97, FIG. 2d, is connected to the Asterisk Latch (FIG. 2d) and by line 95 (FIGS. 2d, 2c, and 2b) to the OR circuit 56 (FIG. 2b) to operate as did the zero recognition signal as described above.

In Step No. 19, as described above, the comma is brought into the B register. However, in the circuit for editing, there is no provision for recognizing a comma (while the body latch is turned on); therefore, the comma is reinserted at the B location 288 (see column B field at end of cycle in the chart above). The comma recognition AND circuit 74, FIG. 2a, is used for a purpose to be described subsequently.

In Step No. 23 the data character zero contained a word mark. Since this is in the A field, this word mark denotes that this is the end of the data word to be edited. At this time the A word mark is sensed in the A register, which produces the AWM signal on a line 101 (FIG. 2b) which feeds an AND circuit 84. The character, namely, "zero" in this case containing this word mark, is retained in the A register (see column REG. A in the chart above) until on step 24 a control word character (to be placed in the B register) which is either a blank, a zero, a dollar sign, or an asterisk, appears (in this case a blank at B field address 285) at which time the OR circuit 89 (FIG. 2b) conditions the other leg of the AND circuit 84 (FIG. 2b). The output of circuit 84 will cause a condenser 85 to charge so that upon termination of the sensing of a blank, zero, $ or asterisk character (step 24 illustrates a blank character), a single shot 86 (FIG. 2b) triggers and resets the body latch 88 and 90 (FIG. 2c). It is noted that the character (the blank in step 24) which determined the fact that the body latch would be turned off also, of course, via the OR circuit 89 (FIG. 2b) applied a signal to the AND gates 94 and 96 (FIG. 2c) to insure that the character standing in the A register (but not its word mark, see A zone and A digit only) would be transferred to the edited portion of the control word, before the body latch was turned off. This is accomplished by having the single shot 86 operate on the turning off time of the AND circuit 84.

When the body latch goes off, the subsequent detection of the dollar sign, or any character, will not affect the A data field since the gates 94 and 96 will no longer be conditioned by the body latch. In the cases where the control word is much longer than the data word, unneeded punctuation such as commas will be left out by the following method. The AND circuit 150 (FIG. 2e) has a series of lines feeding it, these being (in addition to the "comma" recognition line) edit execute 16, not body 18, not reverse scan $\overline{RSD}$, and the line 152 representing detection of an A word mark so that when a comma recognition signal appears after the body latch has been turned off, the EDIT REGENERATE line 151 is operated to insert blanks instead of the particular control word character (here a comma) then being sensed. This prevents an edited word from having commas in it beyond the left limit of the data field.

At the same time that the dollar sign was sensed (step 25), the B field word mark was sensed and activated line 112, feeding AND circuit 104, FIG. 2e. At the same time the Edit input is up and the B cycle line is up. The remaining input which is the output from inverter 109 is up and thus indicates that there is no instruction execute (I/E) change signal from the output of AND circuit 138 and lines connected thereto. This last circuit (with no signal) indicates that the zero suppression latch or some other functional feature had been set. The output from AND circuit 104 via line 110 goes to the cycle control to instruct the machine to initiate a reverse scan which includes turning on the Reverse Scan Delay Latch (FIG. 2b) to address the storage location at the B readdressing 284 to bring the dollar sign back into the B register (see step 26, column REG. B of the chart above) and initiating stepping up, by one, of the B address register (compare steps 26 and 27, "Memory Address Register B" in the chart above). The word mark which was contained with the dollar sign was removed before insertion into the B field by virtue of the AND circuit 142, FIG. 2e, to which line 112 applies the signal representing the B word mark, and line 103 applies the B cycle signal, and line 16 the edit execute signal so that the output of AND circuit 142 via inverter 140 applies a signal clear WM to the inhibit switching circuit 45 (FIG. 1) to prevent the word mark from being fed to memory and thereby removing this word mark.

The reverse scan then continues and each successive B address is incremented by 1, as indicated above, to take the next character from storage and through the B register. On Step No. 27 a zero is sensed in the B register by the AND circuit 42 (FIG. 2a). This feeds an OR circuit 105 which transmits a signal over line 178 (FIGS. 2a, 2b, 2c, 2d, and 2e) to AND circuit 114, FIG. 2e. Since we are in a zero suppress operation and have detected a zero, line 160 feeding AND circuit 114 (FIG. 2e) is up, Reverse Scan line 176 is up, and line 162 Not Decimal Latch is up, the AND circuit 114 generates an Edit Regen signal on line 151, which, as stated above, inserts blanks so that a blank indication is placed in storage in place of the 0. When the reverse scan was initiated, the AND circuit 170 (FIG. 2b) was controlled by signals on lines 107, 111 and the "Edit Execute" signal line to set the reverse scan delay latch 172, 174 (FIG. 2b), which stays on and furnishes reverse scan delay signals RSD.

The zeros which are sensed in the rescanning of the partially edited control word are sensed by the AND circuit 114 (FIG. 2e) to produce the signal "Edit Regen" whereby, as stated above, blanks are inserted until a significant digit is reached. When a significant digit is sensed, the line SIG. DIG. (FIG. 2a) rises and acts, via an inverter to lower the line 115 which operates through the OR circuit 180 (FIG. 2c) to remove one input from AND circuit 72 and drop out the zero suppression latch 70, 72. This zero suppression latch was set, as described above, in the description of step 13. The setting required the succeeding cycle since AND circuit 68 (FIG. 2c) is controlled by both line 113 and the output of Delay circuit 64, 66. Thus any conflict between the set word mark and the zero suppression circuits was prevented.

The machine continues during reverse scan through successive B cycles until Step No. 33 when the word mark of numeral 4 is sensed to produce BWM on line 112 (FIG. 2e) feeding AND circuit 142 which is also fed by the EDIT execute on line 16 and the B cycle line 103, FIG. 2e. The decimal latch 120, 122 (FIG. 2d) connected to an inverter 124 (FIG. 2d) which is not operated (since the latch is OFF) so there is a signal present on output line 162 (NOT DECIMAL LATCH) and a signal is also present on line 108 (FIG. 2e) which is the signal, Not Dollar Latch. AND circuit 138 (FIG. 2e) therefore has all four inputs up and furnishes an output on line 123 to the cycle control to control it to initiate a new instruction cycle and proceed with the program. At the same time the word mark is cleared, via inverter 140 as described above. This completes an ordinary editing operation.

Asterisk fill option

If an asterisk had been placed in the body of the control word in any place other than the first blank position, the following occurs. The AND circuit 97, FIG. 2d, senses for an asterisk when the body line from AND circuit 88 (FIG. 2c) is up to set the asterisk latch 125–127 (FIG. 2d). The asterisk fill is somewhat similar to zero eliminate in that the zero suppression latch is set in a similar manner and causes the machine to readdress and go backward, sensing the digits in the partially edited control word and by means of an AND circuit 129 (FIG 2d) senses the reverse scan delay latch signal on 176 and the zero suppression latch on line 133 to generate a signal, Asterisk Fill, (FIG. 2d) which will be described subsequently in relation to FIG. 8. At the same time the AND circuit 114 (FIG. 2e) will be sensing punctuation and zeros and furnish a signal to Edit Regen line 151. In accordance with the circuit to be described, the asterisk fill generates the characters necessary to indicate an asterisk only when the Edit Regen line 151 has a signal present thereon so that asterisks are inserted instead of blanks for the zeros, which are in the partially edited word. The asterisk fill is effective in the same manner that the zero suppress in that when the not significant digit signal on line 115 occurs, the output of OR circuit 180 drops and zero suppress latch 72–70 drops off, removing one input 133 to AND circuit 129 (producing the asterisk fill signal) and no more asterisk filling occurs.

Floating dollar option

The AND circuit 91 (FIG. 2d) recognizes the code indication of the dollar sign and sets the $ latch 102 and 100 through N block voltage inverter circuit 98. The inverter at the output of the $ latch 117 lowers the voltage on line 108 feeding the AND circuit 138 (FIG. 2e) to indicate there will be no instruction execute change. The AND circuit 104 (FIG. 2e) fed by the Edit Execute line 16, the B cycle line 20, and the B word mark line 112 along with no I/E change signal from inverter 109 produces a readdress signal on its output line 110. When the first blank is sensed by line 139 (FIG. 2d), the AND circuit 136 will generate a signal on line 123 which is the Instruction Execute change signal and the apparatus will take an instruction cycle. At the same time through the AND circuit 141 (FIG. 2d) the "Word Mark Right" signal will be detected to operate through the voltage inverter P circuit 143 to initiate a $ float operation and also through an AND circuit 145 to produce Edit Regen on line 151 (FIG. 2e) and cause the necessary bits to be entered to enter the $ symbol into storage and inhibit the blank. This has the same significance as the asterisk inserting operation did, and the dollar sign will be inserted at the blank position first detected.

Decimal elimination option

In this operation, to take out zeros to the right of the decimal when there are no significant digits present in the decimal portion of the data word, the zero suppress symbol is written in the least significant digit position of the data word which is two positions to the right of the decimal point. On the reverse scan when the decimal point is sensed by an AND circuit 116 (FIG. 2d) and provides an output therefrom, the AND circuit 118 (FIG. 2d) which senses that we are on a reverse scan delay furnishes a signal to the decimal latch consisting of AND circuits 120 and 122 which operate to indicate we have sensed a decimal point. The latch is reset by a drop produced at line 133 (Zero Suppress Latch) by the reset of the zero suppression latch 70, 72 (FIG. 2c), which occurred upon sensing a significant digit. Thus, if a significant digit occurs before the last decimal place in the partially edited data word, the decimal latch will be dropped out and operations terminate. The AND circuit 114 (FIG. 2e) which senses zeros for suppression purposes has an input line 162 which is indicative (when up) of no decimal latch being set. Thus the latch is set, a zero will not be regenerated, as a blank, but will be inserted into the word until the time that we determine that they are not necessary. This is true even though the zero suppression latch is still on, see line 160 from the latch itself. If the decimal latch is reset, then the line 162 goes up and is indicative of no decimal latch being on, the AND circuit 138, FIG. 2e will conduct and indicate on its output line 123 that there is to be an instruction execute change and the operation will be terminated. With no E change and with the decimal latch set, the readdress line 110 will be conditioned by the AND circuit 104 in accordance with the indicated lines thereon. The B word mark 112 is indicative of the fact that in going through the B register a word mark has been sensed to indicate that we must turn around and go backwards if the other conditions are present. With the readdress, the decimal latch is dropped out by the signal from AND circuit 128, FIG. 2d (fed by WMR and a time signal) through inverter 126 at time T00–T30. The word mark right signal comes from a latch in cycle control which was set by the word mark just sensed. On reforward scan (the reverse scan delay latch is still on), the AND circuit 114 (FIG. 2e) will still sense the signal zero, punctuation and provide for inserting blanks for each zero, and the field will be left blank. The output of the decimal AND circuit 116 is connected (FIG. 2a) to the OR circuit 105, whose output on line 178 is connected to the AND circuit 114 (FIG. 2e) so that the decimal point is blanked out via the signal Edit Regen in the same manner that the zeros were. Also on a reverse scan, when the decimal point is sensed, the AND circuit 132 (FIG. 2d) sensing the decimal point is ON, since the Word Mark Right which indicates that we have been on one reverse scan and have set a latch circuit in the cycle control when we obtained a word mark indication on the reverse scan is applied to line 135 so that the output of AND circuit 132, via its output line 123 provides signal I/E change (FIGS. 2d and 2e) to thus end the operation.

Sign control left option

In some applications it is desirable to indicate, on the left of the edited word, the credit symbol CR in case of a minus quantity or have no indication if there is a plus quantity. This is accomplished by the Sign latch circuit 144, 147, FIG. 2d, connected by line 146 to the output of the AND circuit, 12, FIG. 2a, which stored the sign indication from the data word units position and keeps it available for test by the CR-circuits when these symbols are sensed at the left of the control word.

In FIG. 8, the asterisk fill line 131 and the float dollar line 201 are brought to AND circuits 205 and 207, respectively. When the Edit Regen line 151 has a signal thereon, the correct signal will be generated and the results stored in memory 11. The line 203 represents a C bit and provides a C bit indicating a blank. When the asterisk fill or dollar sign latch is set, a $ character or asterisk character is also generated by means of AND circuits 205 and 207.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for editing data characters contained in a data word in accordance with a control word which contains characters which include edit control characters and data replaceable characters to form an edited data word comprising:
  (a) means for scanning the characters in said control word, to generate an output indicative of each said character,
  (b) means for scanning the characters in said data word to generate an output indicative of each said character,
  (c) means for selectively receiving the output from said control character scanning means or said data character scanning means,
  (d) means responsive to the transfer of a control character or a data character from the output of either said scanning means to said receiving means for controlling said scanning means to scan the next successive character in said associated control word or data word respectively,
  (e) said receiving means normally operative to receive the output from said control character scanning means,
  (f) and sensing means responsive to the output of said control word scanning means indicative of a data replaceable character to control said receiving means to receive the output from said data word scanning means,
  (g) whereby data characters from said data word are interspersed with said control word characters in place of said data replaceable characters.

2. The apparatus of claim 1 including at least one special character source and sensing means for said data characters responsive to a non-significant data character for operating said receiving means to receive the output from said special character source in place of said non-significant data character.

3. The apparatus as in claim 2 wherein each said scanning means includes a character storage register for said control characters and a character storage register for said data characters from which an output indicative of the character contained therein is provided, said control word sensing means being responsive to the character contained therein to control the retention of the character contained in the respective register presently providing the output or to transfer the next successively scanned character from said data word or said control word.

4. The apparatus of claim 2 wherein said control word may include data replaceable special control characters and further sensing means for said special control characters to provide an output for selecting the special character to be received by said receiving means.

5. The apparatus of claim 4, further including means responsive to the end of said control word, and the sensing of a special data replaceable control character for re-scanning each character from said edited word and substituting said special control characters for non-significant data characters.

6. A device for editing data characters contained in a data word in accordance with a control word which contains characters which include edit control characters and data replaceable characters,
  (a) storage means for providing an output indicative of each edit character and data replaceable character of said control word,
  (b) storage means for providing an output indicative of each data character of said data word,
  (c) sensing means for the outputs of both said control word storage means and said data word storage means for the simultaneous sensing of successive characters in each word,
  (d) merging means connected to both said control word storage sensing means and said data word storage sensing means, and responsive to the sensing of a data character and a data replaceable control character by said sensing means for replacing said data replaceable character in said control word storage with a data character.

7. The device as in claim 6 further including at least one special character source and means responsive to the sensing of a non-significant data character and a special control character for operating said special character source to replace said data character with a special character in said control word storage.

8. A device for editing data characters contained in a data word in accordance with a control word which contains characters which include edit control characters and data replaceable characters,
  (a) a control register means for providing a temporary storage for each successive character in said control word,
  (b) a data register means for providing a temporary storage for each successive character in said data word,
  (c) sensing means connected to each said register to provide an output of both said control word register means and said data word register means for the simultaneous sensing of successive characters in each word,
  (d) a common storage means for receiving one of said simultaneously sensed characters from one of said registers,
  (e) control means responsive to an edit control character in said control word register to transfer said character in said register to said storage and to transfer the next successive control character in said control word to said control word register,
  (f) and means included in said control means responsive to the sensing of a data replaceable character in said control word register to transfer said character in said data word register to the storage and to transfer the next successive data character and control character to their respective registers.

9. The device as in claim 8 further including at least one special character source and means responsive to the sensing of a non-significant data character and a special control character for operating said special character source to replace said data character with a special character in said common storage means.

10. The device of claim 9 further including means in said control means responsive to the sensing of the final character in said data word for suppressing edit control successive characters in the body of said control word and operating a special character source to transfer a special character to said storage for each so sensed edit control character.

11. The device of claim 9 further including
  means responsive to a special character in said control word for setting a special character control indicative of a special character replacement operation,
  means responsive to the sensing of the final character in said control word and to the setting of the special character control to control the transfer of each character of said edited word in said common storage to said first register wherein each non-significant character sensed will control said special character source to replace said non-significant character with a special character, and
  means responsive to the sensing of the first significant digit for terminating said replacement operation.

12. The device of claim 11 wherein said special character is a dollar sign further including
  means to again control the transfer of said edited word through said first register, and
  means responsive to the sensing of the first non-significant digit for operating a special character source to insert a dollar sign.

13. The device of claim 8 wherein said common storage contains
  both said data word and said control word, said control register being connected to the output of said storage and said data register being connected to the output of said first register wherein data transferred to said data register will be transferred through said control register, and said control circuitry being connected to the output of said control register and said data register to control the transfer of said data to said common storage.

14. The device of claim 13 wherein characters from said common storage are transferred to said registers on alternate timing cycles of said device wherein said control circuitry normally connected to transfer only control characters is responsive to data replaceable control characters to operate said device on an alternate timing cycle to transfer data to said data register.

References Cited by the Examiner

UNITED STATES PATENTS 3,107,342   10/63   Estrems et al. _____ 340—172.5

MALCOLM A. MORRISON, *Primary Examiner.*